(12) United States Patent
Itano

(10) Patent No.: US 7,447,433 B2
(45) Date of Patent: Nov. 4, 2008

(54) OPTICAL COMMUNICATION DEVICE

(75) Inventor: Seiho Itano, Tokyo (JP)

(73) Assignee: Allied Telesis Holdings K.K., Tokyo (JP)

( * ) Notice: Subject to any disclaimer, the term of this patent is extended or adjusted under 35 U.S.C. 154(b) by 427 days.

(21) Appl. No.: 11/243,769

(22) Filed: Oct. 5, 2005

(65) Prior Publication Data

US 2006/0078340 A1 Apr. 13, 2006

(30) Foreign Application Priority Data

Oct. 12, 2004 (JP) ............................. 2004-298242

(51) Int. Cl.
*H04B 10/08* (2006.01)
*H04B 10/02* (2006.01)
*H04J 14/02* (2006.01)
(52) U.S. Cl. ............................. 398/82; 398/31; 398/175
(58) Field of Classification Search .................. 398/82, 398/83, 30–33, 174–177
See application file for complete search history.

(56) References Cited

U.S. PATENT DOCUMENTS 6,532,320 B1 * 3/2003 Kikuchi et al. ................ 385/24
6,810,215 B1 * 10/2004 Oikawa ...................... 398/175

FOREIGN PATENT DOCUMENTS

JP 2001-103090 4/2001

* cited by examiner

*Primary Examiner*—Dalzid Singh
(74) *Attorney, Agent, or Firm*—Steven J. Hultquist; Intellectual Property Technology Law

(57) ABSTRACT

An optical communication device enabling confirmation of frames flowing through a communication line without affecting such line. The optical communication device includes a first conversion unit that converts a first optical signal transmitting a first frame group including a first maintenance frame into a first electrical signal; a frame duplication unit that receives the first electrical signal, generates a second electrical signal that transmits the first frame group, and outputs the first electrical signal; a second conversion unit that converts the first electrical signal output by the frame duplication unit into a second optical signal; and a third conversion unit that converts the second electrical signal generated by the frame duplication unit into a third optical signal.

4 Claims, 2 Drawing Sheets

OPTICAL COMMUNICATION DEVICE

CROSS-REFERENCE TO RELATED APPLICATIONS

This application claims priority under 35 USC 119 of Japanese Patent Application No. 2004-298242, filed on Oct. 12, 2004. The entire disclosure of said Japanese Patent Application is hereby incorporated herein by reference in its entirety.

BACKGROUND

The present invention relates to an optical communication device. More particularly, the present invention relates to an optical communication device that makes it possible to confirm frames that flow through a communication line without affecting the communication line.

Conventional packet capture devices include the packet capture device disclosed in Japanese Patent Application Laid Open No. 2001-103090. The conventional packet capture device above is connected to a communication network, captures packets that are transmitted on a communication network and performs an evaluation of the communication quality of a data communication device and network lines and so forth.

However, the conventional packet capture device above must be connected to the actual line Itself through which packets actually flow in the communication network. Therefore, there has been the problem that, when the communication quality of the network line is evaluated and so forth, the actual line cannot be maintained.

SUMMARY

Therefore, it is an object of the present invention to provide an optical communication device which overcomes the above issues in the related art. This object is achieved by combinations described in the independent claims. The dependent claims define further advantageous and exemplary combinations of the present invention.

In order to achieve the above object, according to a first aspect of the present invention, an optical communication device, comprising a first conversion unit that converts a first optical signal that transmits a first frame group comprising a first maintenance frame into a first electrical signal; a frame duplication unit that receives the first electrical signal, generates a second electrical signal that transmits the first frame group, and outputs the first electrical signal; a second conversion unit that converts the first electrical signal output by the frame duplication unit into a second optical signal; and a third conversion unit that converts the second electrical signal generated by the frame duplication unit into a third optical signal, is provided.

The optical communication device preferably further comprises a filter that allows some frames among a plurality of frames that constitute the first frame group transmitted by the second electrical signal to pass, wherein the third conversion unit preferably converts the second electrical signal that transmits the some of the frames into the third optical signal.

In the case of the optical communication device, the filter preferably allows the some of the frames to pass such that the some of the frames comprise the first maintenance frame.

In the case of the optical communication device, the second conversion unit preferably converts a fourth optical signal that transmits a second frame group comprising a second maintenance frame into a third electrical signal; the frame duplication unit preferably receives the third electrical signal, generates a fourth electrical signal that transmits the second frame group, and outputs the third electrical signal; the first conversion unit preferably converts the third electrical signal output by the frame duplication unit into a fifth optical signal; and the third conversion unit preferably converts the fourth electrical signal generated by the frame duplication unit into a sixth optical signal that transmits at least the second maintenance frame.

The optical communication device preferably further comprises a selection unit that selects one of the second electrical signal and the fourth electrical signal, wherein the third conversion unit preferably converts the second electrical signal or the fourth electrical signal selected by the selection unit into the third optical signal or the sixth optical signal.

DETAILED DESCRIPTION

The present invention is described hereinbelow via embodiments of the invention with reference to the drawings. However, the following embodiments do not limit the invention of the claims and all the combinations of characteristics illustrated in the embodiments are not required by the means for solving the invention.

Figure 1:
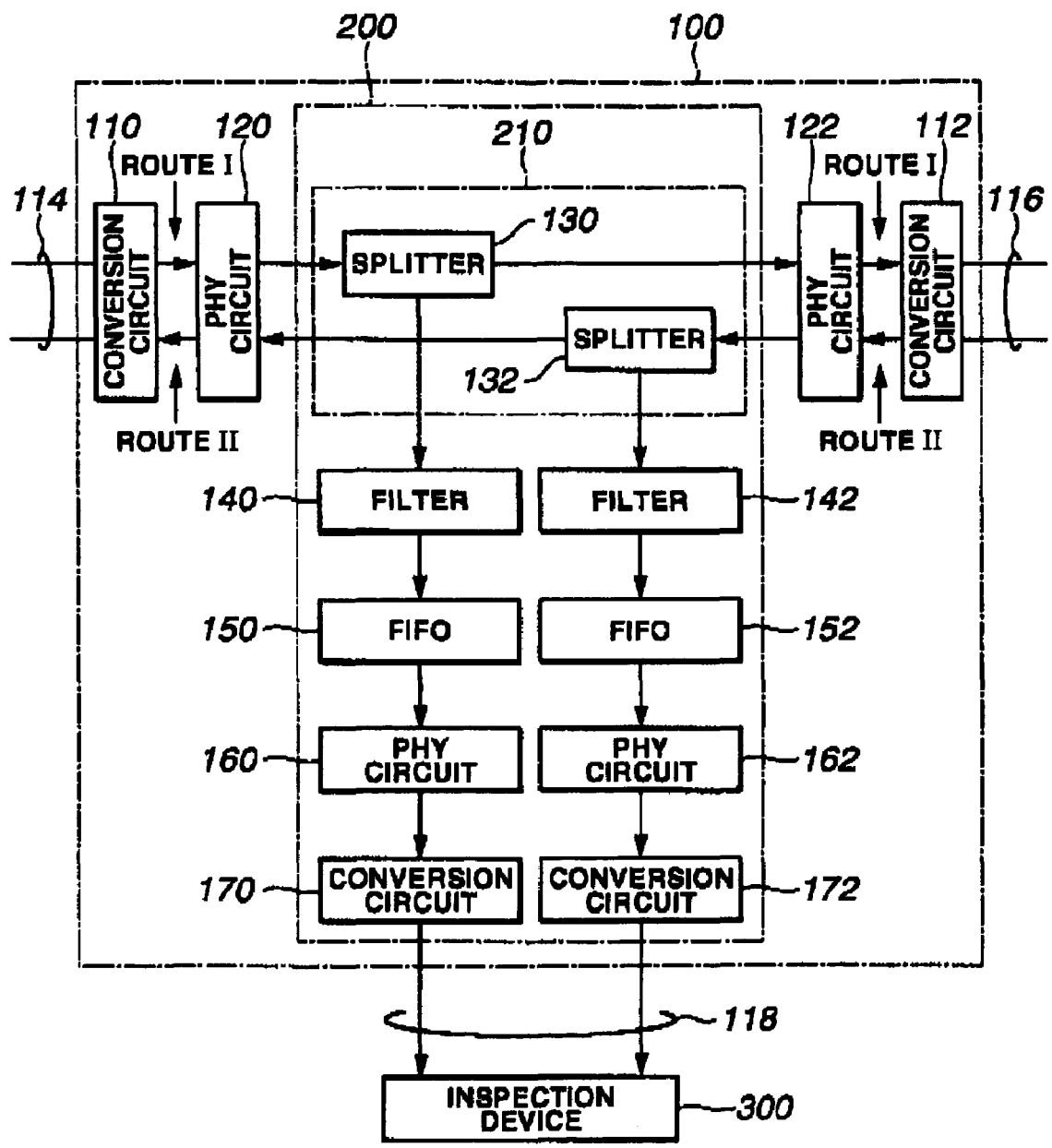
FIG. 1 shows the constitution of a first embodiment of an optical communication device 100.

FIG. 1 shows the constitution of the first embodiment of the optical communication device 100 of the present invention. The optical communication device 100 is constituted comprising conversion circuits 110 and 112, which are an example of first and second conversion units, as well as PHY circuits 120 and 122 and a mirroring unit 200. In the optical communication device 100 of this embodiment, the optical transmission channels 114 are connected to the conversion circuits 110 and the optical transmission channels 116 are connected to the conversion circuit 112. Optical signals are received from the optical transmission channel 114 and supplied to the optical transmission channel 116 via a signal route I that passes through the conversion circuit 110, PHY circuit 120, mirroring unit 200, PHY circuit 122, and then the conversion circuit 112. Also, optical signals are received from the optical transmission channel 116 and supplied to the optical transmission channel 114 via a signal route II that passes through the conversion circuit 112, PHY circuit 122, mirroring unit 200, PHY circuit 120, and then the conversion circuit 110.

Further, in the optical communication device 100 of this embodiment, the mirroring unit 200 copies frame groups that flow through the signal route I and/or the signal route II Then, the mirroring unit 200 generates optical signals that transmit at least some of the frame group and supplies the optical signals to an optical transmission channel 118. The constitution of each part of the optical communication device 100 of this embodiment will be described hereinbelow.

The conversion circuit 110 receives optical signals that transmit optical transmission channels 114. The conversion circuit 110 converts the optical signals into electrical signals (serial signals) and supplies same to the PHY circuit 120. The conversion circuit 110 then receives the electrical signals (serial signals) that are output by the PHY circuit 120. Then, the conversion circuit 110 converts the electrical signals into optical signals and supplies same to the optical transmission channels 114. The conversion circuit 112 receives optical signals that transmit optical transmission channels 116. The conversion circuit 112 converts the optical signals into electrical signals (serial signals), and supply same to the PHY circuit 122. The conversion circuit 112 then receives the electrical signals (serial signals) that are output by the PHY circuit 122. Then, the conversion circuit 112 converts the electrical signals into optical signals and supplies same to the optical transmission channels 116.

In this embodiment, each optical signal transmits a frame group comprising, in addition to data frames, maintenance frames, routing protocol control frames, flow control frames, and error frames, and so forth. When the conversion circuits 110 and 112 convert optical signals into electrical signals, conversion is implemented such that the frame group is transmitted by the electrical signals as is. That is, in this embodiment, the electrical signals converted by the conversion circuits 110 and 112 also transmit as is frames that are not recognized as data frames such as maintenance frames, routing protocol control frames, flow control frames, and error frames.

The PHY circuit 120 converts serial signals (electrical signals) supplied by the conversion circuits 110 into parallel signals (electrical signals), and supplies the parallel signals to the mirroring unit 200. Further, in this embodiment, a frame duplication unit 210, which constitutes the mirroring unit 200, outputs parallel signals as electrical signals. The PHY circuit 120 converts the parallel signals (electrical signals) supplied by the mirroring unit 200 into serial signals (electrical signals) and supplies the serial signals to the conversion circuits 110. Also, the PHY circuit 122 converts serial signals (electrical signals) supplied by the conversion circuits 112 into parallel signals (electrical signals), and supplies the parallel signals to the mirroring unit 200. Further, in this embodiment, a frame duplication unit 210, which constitutes the mirroring unit 200, outputs parallel signals as electrical signals. The PHY circuit 122 converts the parallel signals (electrical signals) supplied by the mirroring unit 200 into serial signals (electrical signals) and supplies the serial signals to the conversion circuits 112. Although the conversion circuits 110 and 112 and the PHY circuits 120 and 122 are provided separately in the case of this embodiment, these components may be integrated.

The mirroring unit 200 is constituted comprising a frame duplication unit 210 that comprises splitters 130 and 132, filters 140 and 142, FIFOs 150 and 152, PHY circuits 160 and 162, which are one example of the third conversion unit, and conversion circuits 170 and 172.

The splitter 130 duplicates electrical signals that are supplied by the PHY circuits 120. That is, the splitter 130 supplies received electrical signals to the PHY circuit 122, duplicates the received electrical signals, and supplies same to the filter 140. Also, the splitter 132 duplicates electrical signals that are supplied by the PHY circuits 122. That is, the splitter 132 supplies received electrical signals to the PHY circuit 120, duplicates the received electrical signals, and supplies same to the filter 142. As a result, the frame groups transmitted by the electrical signals supplied from the PHY circuit 120 to the splitter 130 can be transmitted as is by electrical signals that are supplied from the splitter 130 to the filter 140. Further, the splitter 130 receives parallel signals as electrical signals from the PHY circuit 120 and duplicates the parallel signals before supplying same to the filter 140. Similarly, the frame groups transmitted by the electrical signals supplied from the PHY circuit 122 to the splitter 132 can be transmitted as is by electrical signals that are supplied from the splitter 132 to the filter 142. Further, the splitter 132 receives parallel signals as electrical signals from the PHY circuit 122 and duplicates the parallel signals before supplying same to the filter 142.

The filter 140 filters a plurality of frames and transmits a part of the frames. The plurality of frames constitutes the frame groups transmitted by the electrical signals that are supplied by the splitters 130. Similarly, the filter 142 filters a plurality of frames and transmits a part of the frames. The plurality of frames constitutes the frame groups transmitted by the electrical signals that are supplied by the splitters 132. That is, the filter 140 generates electrical signals that transmit only passing frames from which predetermined frames have been removed from a plurality of frames constituting the frame groups. Then, the filter 140 supplies the passing frames to the FIFOs 150. Similarly, the filter 142 generates electrical signals that transmit only passing frames from which predetermined frames have been removed from a plurality of frames constituting the frame groups. Then, the filter 142 supplies the passing frames to the FIFOs 152.

The filter 140 is constituted capable of generating the passing frames by selecting optional frames from the pluralities of frames that constitute the frame groups and capable of supplying the passing frames to the FIFO 150. The filter 142 is constituted capable of generating the passing frames by selecting optional frames from the pluralities of frames that constitute the frame groups and capable of supplying the passing frames to the FIFO 152. Further, the filters 140 and 142 may generate electrical signals such that passing frames comprise maintenance frames, Further, the filters 140 and 142 may generate electrical signals to allow frames used in specified applications such as frames relating to VoIP, for example, to pass.

The FIFO 150 is provided between the filter 140 and PHY circuit 160. Also, The FIFO 152 is provided between the filter 142 and PHY circuit 162. The FIFOs 150 and 152 store the frame groups received from the filters 140 and 142. The FIFOs 150 and 152 supply the stored frame groups to the PHY circuits 160 and 162 in accordance with the operating frequency required by the PHY circuits 160 and 162. As a result, even when the transmission and reception frequencies between the conversion circuits 110 and 112 and the conversion circuits 170 and 172 are different, the transmission and reception of frames can be performed.

The PHY circuit 160 converts parallel signals (electrical signals), which transmit the frame groups supplied by the FIFO 150, into serial signals (electrical signals) and supplies the serial signals to the conversion circuit 170. Similarly the PHY circuit 162 converts parallel signals (electrical signals), which transmit the frame groups supplied by the FIFO 152, into serial signals (electrical signals) and supplies the serial signals to the conversion circuit 172.

The conversion circuits 170 and 172 are each connected to an external inspection device 300 and each receive an electrical signal (serial signal) that transmits a frame group that flows through the signal route I and/or signal route II. The conversion circuits 170 and 172 convert the electrical signals into optical signals and supply the optical signals to the inspection device 300 via the optical transmission channel 118.

Figure 2:
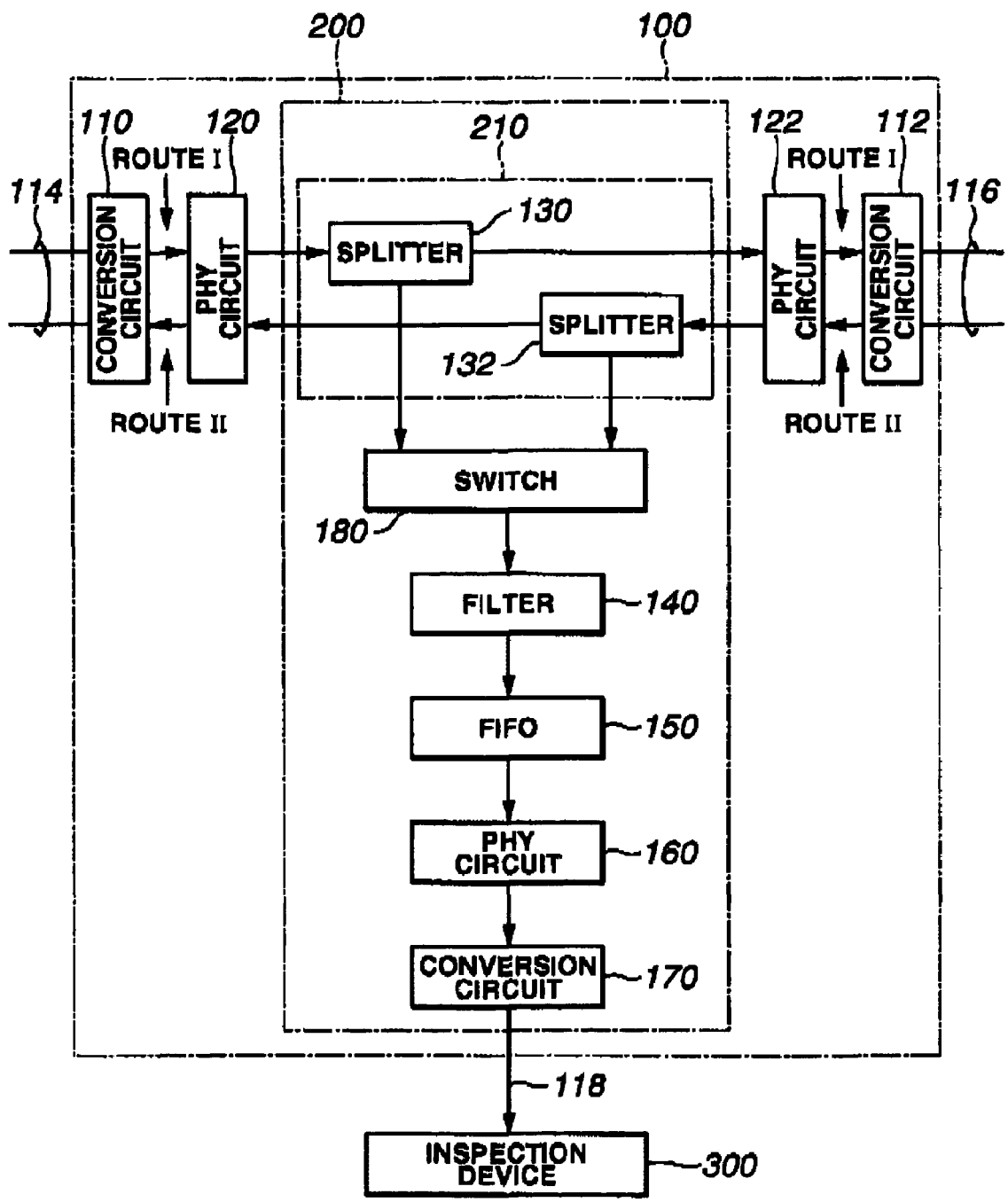
FIG. 2 shows the constitution of a second embodiment of the optical communication device 100.

FIG. 2 shows the constitution of the second embodiment of the optical communication device 100. The optical communication device 100 of the second embodiment will be described hereinbelow with a focus on points that differ from those of the first embodiment. Further, a constitution in which the same reference numerals as those of the first embodiment are assigned has the same functions as those of the first embodiment.

The optical communication device 100 of this embodiment differs from the constitution of the first embodiment in that the mirroring unit 200 further comprises a switch 180, which is one example of a selection unit. The switch 180 receives both electrical signals that are generated by the splitters 130 and 132 and supplies one of the electrical signals to the filter 140. That is, the switch 180 supplies either one of the frame groups flowing through the signal route I and signal route II to the filter 140. Further, the optical communication device 100 supplies optical signals that transmit frame groups that flow through the signal route I or II selected by the switch 180 via the FIFO 150, PHY circuit 160, and conversion circuit 170 to the external inspection device 300 via the optical transmission channel 118.

In the embodiment above, optical signals rendered by duplicating frame groups comprising maintenance frames that flow through the signal routes I and/or II can be supplied to an external device. That is, in the embodiment above, maintenance frames and so forth that flow through the signal routes I and/or II without affecting the frame groups flowing through the signal routes I and/or II can be confirmed. Therefore, according to the above embodiment, because the state of the communication line can be confirmed while the communication line is still maintained, that is, while the communication is still made via the communication line, it is possible to perform an analysis of whether a fault was caused by a network device or by the line when a fault occurs, to confirm the traffic on the communication line, and to check the quality of the communication line and so forth while the communication line is still maintained.

Furthermore, according to the above embodiment, the frame group that flows through the signal routes I and/or II is copied as is, and because it is possible to allow only desired frames that are used only in specified applications to pass by means of a filter. Therefore, maintenance processing for the specified applications such as confirming communication quality by allowing only frames pertaining to VoIP to pass can be performed, for example.

In the above embodiments, the inspection device 300 performs inspections of the communication line and so forth on the basis of optical signals that are supplied by the optical communication device 100. However, the optical communication device 100 may supply electrical signals instead of the optical signals to the inspection device 300 and the inspection device 300 may perform inspections of the communication line and so forth on the basis of the electrical signals. In this case, the optical communication device 100 need not comprise conversion circuits 170 and 172 or conversion circuits 170 and 172 in addition to the PHY circuits 160 and 162. Further, the optical communication device 100 may further comprise terminals or the like that output the electrical signals in addition to the conversion circuits 170 and 172.

Furthermore, in the above embodiments, the optical communication device 100 receives optical signals via the optical transmission channels 114 and 116 and copies the frame groups. However, the optical communication device 100 may receive electrical signals that transmit frame groups instead of optical signals, duplicate the electrical signals, and supply same to the inspection device 300. In this case, the optical communication device 100 need not comprise conversion circuits 170 and 172 or conversion circuits 170 and 172 as well as the PHY circuits 160 and 162. Further, the optical communication device 100 may further comprise terminals or the like which the electrical signals are input to and output from in addition to the conversion circuits 170 and 172.

Although the embodiments of the present invention have been described with reference to specific examples and applications, the scope of the present invention is not limited to these embodiments. Those skilled in the art can make various modifications and improvements to these embodiments of the present invention. It is clear from the appended claims that such modifications or improvements are also covered by the scope of the present invention.

I claim:

1. An optical communication device, comprising:
    a first conversion unit that converts a first optical signal that transmits a first frame group comprising a first maintenance frame into a first electrical signal;
    a frame duplication unit that receives the first electrical signal, generates a second electrical signal that transmits the first frame group, and outputs the first electrical signal;
    a second conversion unit that converts the first electrical signal output by the frame duplication unit into a second optical signal;
    a third conversion unit that converts the second electrical signal generated by the frame duplication unit into a third optical signal; and
    a filter that allows some frames among a plurality of frames that constitute the first frame group transmitted by the second electrical signal to pass, wherein the third conversion unit converts the second electrical signal that transmits the some of the frames into the third optical signal.

2. The optical communication device according to claim 1, wherein the filter allows the some of the frames to pass such that the some of the frames comprise the first maintenance frame.

3. An optical communication device, comprising:
    a first conversion unit that converts a first optical signal that transmits a first frame group comprising a first maintenance frame into a first electrical signal;
    a frame duplication unit that receives the first electrical signal, generates a second electrical signal that transmits the first frame group, and outputs the first electrical signal;
    a second conversion unit that converts the first electrical signal output by the frame duplication unit into a second optical signal; and
    a third conversion unit that converts the second electrical signal generated by the frame duplication unit into a third optical signal, wherein:
    the second conversion unit converts a fourth optical signal that transmits a second frame group comprising a second maintenance frame into a third electrical signal;
    the frame duplication unit receives the third electrical signal, generates a fourth electrical signal that transmits the second frame group, and outputs the third electrical signal;
    the first conversion unit converts the third electrical signal output by the frame duplication unit into a fifth optical signal; and
    the third conversion unit converts the fourth electrical signal generated by the frame duplication unit into a sixth optical signal that transmits at least the second maintenance frame.

4. The optical communication device according to claim 3, further comprising:
    a selection unit that selects one of the second electrical signal and the fourth electrical signal,
    wherein the third conversion unit converts the second electrical signal or the fourth electrical signal selected by the selection unit into the third optical signal or the sixth optical signal.

* * * * *

UNITED STATES PATENT AND TRADEMARK OFFICE
CERTIFICATE OF CORRECTION

PATENT NO. : 7,447,433 B2  Page 1 of 1
APPLICATION NO. : 11/243769
DATED : November 4, 2008
INVENTOR(S) : Seiho Itano It is certified that error appears in the above-identified patent and that said Letters Patent is hereby corrected as shown below:

Column 1, line 27: "actual line Itself" should be -- actual line itself --.

Column 4, line 28: "frames, Further" should be -- frames. Further --.

Signed and Sealed this

Tenth Day of February, 2009

JOHN DOLL
*Acting Director of the United States Patent and Trademark Office*